(12) United States Patent
Fujimori

(10) Patent No.: US 8,754,982 B2
(45) Date of Patent: Jun. 17, 2014

(54) IMAGE PICKUP UNIT AND METHOD OF MANUFACTURING THE SAME

(75) Inventor: Noriyuki Fujimori, Suwa (JP)

(73) Assignee: Olympus Corporation, Tokyo (JP)

( * ) Notice: Subject to any disclaimer, the term of this patent is extended or adjusted under 35 U.S.C. 154(b) by 429 days.

(21) Appl. No.: 12/896,995

(22) Filed: Oct. 4, 2010

(65) Prior Publication Data
US 2011/0085076 A1    Apr. 14, 2011

(30) Foreign Application Priority Data
Oct. 9, 2009    (JP) .................... 2009-235533

(51) Int. Cl.
  *H04N 5/225*    (2006.01)
  *H04N 3/14*    (2006.01)

(52) U.S. Cl.
  CPC ........... *H04N 5/2253* (2013.01); *H04N 5/2254* (2013.01); *H04N 5/2257* (2013.01)
  USPC ............................. 348/374; 348/335; 348/294

(58) Field of Classification Search
  USPC .................... 348/335, 340, 373–374
  See application file for complete search history.

(56) References Cited

U.S. PATENT DOCUMENTS

| | | | |
|---|---|---|---|
| 6,384,397 B1 * | 5/2002 | Takiar et al. ............... | 250/208.1 |
| 6,762,796 B1 * | 7/2004 | Nakajoh et al. ............ | 348/340 |
| 7,227,236 B1 * | 6/2007 | Lee et al. .................. | 438/48 |
| 7,821,564 B2 * | 10/2010 | Avron et al. ............... | 348/340 |
| 8,092,102 B2 * | 1/2012 | Shangguan et al. ......... | 348/340 |
| 2002/0154239 A1 * | 10/2002 | Fujimoto et al. ........... | 348/340 |
| 2006/0145325 A1 * | 7/2006 | Yang et al. ................. | 257/680 |
| 2009/0130791 A1 * | 5/2009 | Kwon et al. ............... | 438/65 |
| 2009/0200589 A1 * | 8/2009 | Qian et al. ................. | 257/292 |
| 2011/0037886 A1 * | 2/2011 | Singh et al. ............... | 348/340 |

FOREIGN PATENT DOCUMENTS

| | | |
|---|---|---|
| JP | 6-112461 A | 4/1994 |
| JP | 9-232548 A | 9/1997 |
| JP | 2000-125212 A | 4/2000 |
| JP | 2001-245217 A | 9/2001 |
| JP | 2003-319217 A | 11/2003 |
| JP | 2008-166939 A | 7/2008 |
| JP | 2009-005328 | 1/2009 |
| JP | 2009-16691 A | 1/2009 |

* cited by examiner

*Primary Examiner* — Nhan T Tran
(74) *Attorney, Agent, or Firm* — Scully, Scott, Murphy & Presser, P.C.

(57) ABSTRACT

An image pickup unit according to the present invention includes: a lens frame that internally holds an image pickup optical system; and a backside illuminated image pickup device which has a light-receiving section that receives light entering the lens frame via the image pickup optical system and which is held inside the lens frame, wherein a claw portion of the lens frame abuts an opposing surface that opposes a light-entering surface of the image pickup device so as to define a position of the image pickup optical system in an optical axis direction L with respect to the light-receiving section using the opposing surface as a reference.

6 Claims, 3 Drawing Sheets h1>h2

IMAGE PICKUP UNIT AND METHOD OF MANUFACTURING THE SAME

CROSS REFERENCE TO RELATED APPLICATION

This application claims benefit of Japanese Application No. 2009-235533 filed in Japan on Oct. 9, 2009, the contents of which are incorporated by this reference.

BACKGROUND OF THE INVENTION

1. Field of the Invention

The present invention relates to an image pickup unit including an image pickup optical system and a backside illuminated image pickup device, and a method of manufacturing the image pickup unit.

2. Description of the Related Art

Conventionally, solid-state image pickup devices (hereinafter simply referred to as image pickup devices) such as CCDs and CMOSs, which pick up images of a subject by converting light entering a light-receiving section provided on a semiconductor substrate into an electrical signal, are well known.

In addition, while such an image pickup device is used in electronic endoscopes, camera-equipped cell-phones, digital cameras, and the like as an image pickup unit in combination with an image pickup optical system, when manufacturing such an image pickup unit, an image pickup optical system must be arranged with high positional accuracy in the direction of an optical axis of the image pickup optical system (hereinafter simply referred to as an optical axis direction) with respect to a light-receiving surface of a light-receiving section of the image pickup device. This is because if the image pickup optical system is arranged displaced in the optical axis direction with respect to the light-receiving surface, a focal position of the subject whose image is formed on the light-receiving section via the image pickup optical system becomes displaced.

In consideration thereof, Japanese Patent Application Laid-Open Publication No. 2009-005328 discloses a configuration of an image pickup unit structural body in which a light-receiving surface of a light-receiving section of an image pickup device is provided with a first optical system that functions as a cover glass for protecting the light-receiving surface and a lens frame for holding a second optical system is mounted on the first optical system, wherein a position of the second optical system in a direction of an optical axis with respect to the light-receiving surface of the image pickup device is defined using a surface of the first optical system on the side of the second optical system as a reference.

SUMMARY OF THE INVENTION

In simple terms, an image pickup unit according to the present invention includes a frame body that internally holds an image pickup optical system and a backside illuminated image pickup device which has a light-receiving section that receives light entering the frame body via the image pickup optical system and which is held inside the frame body, wherein the frame body includes an abutting portion that abuts an opposing surface that opposes a light-entering surface on which the light-receiving section of the image pickup device is arranged, and a position of the image pickup optical system with respect to the light-receiving section is defined using the opposing surface as a reference.

The above and other objects, features and advantages of the invention will become more clearly understood from the following description referring to the accompanying drawings.

DETAILED DESCRIPTION OF THE PREFERRED EMBODIMENTS

Figure 1:
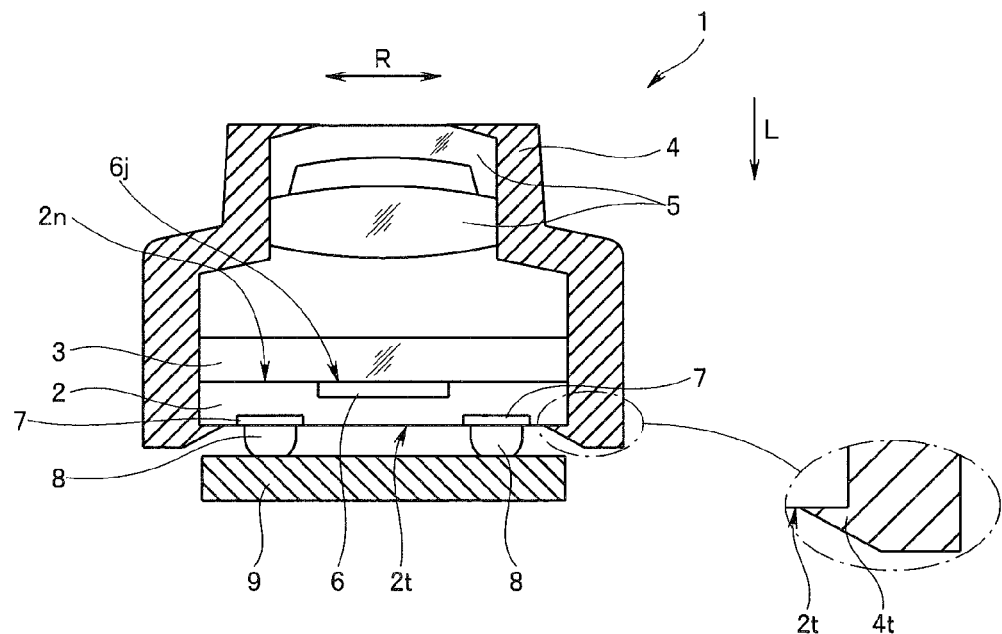
FIG. 1 is a partial cross-sectional view schematically illustrating a configuration of an image pickup unit according to a first embodiment.

Hereinafter, embodiments of the present invention will be described with reference to the drawings. It should be noted that the drawings are merely schematic and that the relationship between a thickness and a width of each member, ratios between thicknesses of the respective members, and the like may differ from actual measurements. Moreover, it should be obvious that relationships and ratios of measurements presented in the drawings may include portions that differ among the drawings.

First Embodiment

FIG. 1 is a partial cross-sectional view schematically illustrating a configuration of an image pickup unit according to the present embodiment.

As illustrated in FIG. 1, an image pickup unit 1 includes a lens frame 4 that is a frame body which internally holds an image pickup optical system 5. While the image pickup optical system 5 is made up of a plurality of lenses in FIG. 1, the image pickup optical system 5 may alternatively be made of a single lens. In addition, the lens frame 4 is shaped such that a midway position in an optical axis direction L is bent in, for example, a crank shape.

Inside the lens frame 4, a known backside illuminated image pickup device 2 that includes a light-receiving section 6 is held by the lens frame 4 in a direction in which light enters the inside of the lens frame 4 via the image pickup optical system 5 or, in other words, more backward in the optical axis direction L (hereinafter simply referred to as backward) than the image pickup optical system 5.

Moreover, an outer circumferential surface of the image pickup device 2 need not necessarily be adhered to an inner circumferential surface of the lens frame 4. This is because when adhesion is performed using a light-curing adhesive, a claw portion 4t of the lens frame 4, to be described later, makes it difficult for UV light to irradiate the adhesive.

As well known, the backside illuminated image pickup device 2 is configured such that a wiring layer is formed on a substrate and to have a thickness of 5 to 10 µm in an optical axis direction L. Since the substrate is to be ground down, a thickness tolerance of the image pickup device 2 is specified as ± several ten nm when using a known SOI (silicon on insulator) substrate as the substrate and as around ±1 µm when using a monocrystalline silicon substrate (bulk substrate). Moreover, the wiring layer is formed on the substrate with a high accuracy at which a thickness tolerance is almost negligible.

In addition, with the backside illuminated image pickup device 2, the substrate is ground down because, as well known, the backside illuminated image pickup device 2 is configured such that light is entered from the side of the substrate which normally has a thickness of several hundred µm to 1 mm, and given that the reachable distance of light is around several µm to several ten µm, light cannot enter the light-receiving section 6 unless the substrate is ground down.

Returning now to FIG. 1, a known cover glass 3 for protecting a light-receiving surface 6j of the light-receiving section 6 is adhered onto a surface of the image pickup device 2 on the side of the image pickup optical system 5 (hereinafter referred to as a light-entering surface 2n). In addition to protecting the light-receiving surface 6j, the cover glass 3 also has a function of supporting the thinly formed image pickup device 2 with a thickness of 5 to 10 µm so as to prevent mechanical deformation and damage.

An electrode pad 7 is formed on an opposing surface 2t opposing the light-entering surface 2n of the image pickup device 2. A printed circuit board 9 is electrically connected to the electrode pad 7 via an electrode 8 that is a solder ball or the like.

In addition, a part of the lens frame 4 or, more particularly, a claw portion 4t (abutting portion) that protrudes inward in a radial direction R of the lens frame 4 from an end portion of the lens frame 4 in the optical axis direction L on the side holding the image pickup device 2 abuts the opposing surface 2t that opposes the light-receiving surface 6j of the image pickup device 2. Moreover, the claw portion 4t and the opposing surface 2t are adhered to each other by, for example, a light-curing adhesive.

Furthermore, the abutting of the claw portion 4t to the opposing surface 2t is performed after the cover glass 3 covers an outer circumference of the image pickup device 2 adhered to the light-entering surface 2n by pulling the lens frame 4 that holds the image pickup optical system 5 frontward in the optical axis direction L in a state where the claw portion 4t is tentatively abutted to the opposing surface 2t via an adhesive.

As a result, with the opposing surface 2t abutted by the claw portion 4t as a reference, the position of the image pickup optical system 5, which is held by the lens frame 4, in the optical axis direction L with respect to the light-receiving section 6 of the image pickup device 2 is accurately defined.

This is because, as described above, with the image pickup device 2, since the thickness tolerance is defined to around ± several ten nm to around ±1 µm and a dimensional tolerance in the optical axis direction L of the opposing surface 2t which is abutted by the claw portion 4t and the image pickup optical system 5 is defined to around ±5 µm, when the position of the image pickup optical system 5 in the optical axis direction L with respect to the light-receiving section 6 is defined in a state where the claw portion 4t is abutted to the opposing surface 2t, the position of the image pickup optical system 5 is only displaced by (around ± several ten nm to around ±1 µm)+(around ±5 µm).

Moreover, given that this value is significantly smaller in comparison to a conventional configuration in which an image pickup optical system is stacked on top of a cover glass that inevitably has a thickness tolerance of ± several ten µm to around 60 µm and the image pickup optical system becomes displaced in the optical axis direction from a light-receiving section by precisely the thickness tolerance, the dimensional tolerance of the image pickup optical system 5 with respect to the light-receiving section 6 can be improved compared to a conventional configuration.

In addition, in the present configuration, the image pickup device 2 is limited to a backside illuminated image pickup device because a front side illuminated image pickup device is a structure in which the substrate is not ground down and a thickness tolerance of around ± several ten µm is normally created on the manufactured substrate, and the position of the light-receiving section 6 in the optical axis direction L cannot be accurately defined with respect to the image pickup optical system 5 even by using the present configuration.

As described above, the present embodiment has shown that the position of the image pickup optical system 5 in the optical axis direction L with respect to the light-receiving section 6 is defined by having the claw portion 4t of the lens frame 4 that internally holds the image pickup optical system 5 abut the opposing surface 2t of the backside illuminated image pickup device 2 that is held inside the lens frame 4.

Accordingly, since the position of the image pickup optical system 5 in the optical axis direction L with respect to the light-receiving section 6 can be defined with a tolerance of (around ± several ten nm to around ±1 µm)+(around ±5 µm), the image pickup optical system 5 can be mounted with greater accuracy than before. Therefore, an image pickup unit 1 capable of acquiring a high-resolution image with no defocusing can be provided.

In addition, since the image pickup unit 1 can be manufactured by simply covering the outer circumference of the image pickup device 2 with the lens frame 4 that holds the image pickup optical system 5 and having the claw portion 4t abut the opposing surface 2t of the image pickup device 2 while pulling the claw portion 4t frontward in the optical axis direction, cost reduction can be achieved in addition to easier assembly of the image pickup unit 1.

Furthermore, by having the lens frame 4 fit onto the outer circumferential surface of the image pickup device 2, the position of the image pickup device 2 can be defined not only in the optical axis direction L but also in two directions perpendicular to the optical axis direction L. Therefore, the assembly accuracy of the image pickup device 2 can be further improved.

As shown, the image pickup unit 1 having a configuration that enables the image pickup optical system 5 to be arranged with high positional accuracy with respect to the light-receiving surface 6j of the light-receiving section 6 of the image pickup device 2 can be provided.

Figure 2:
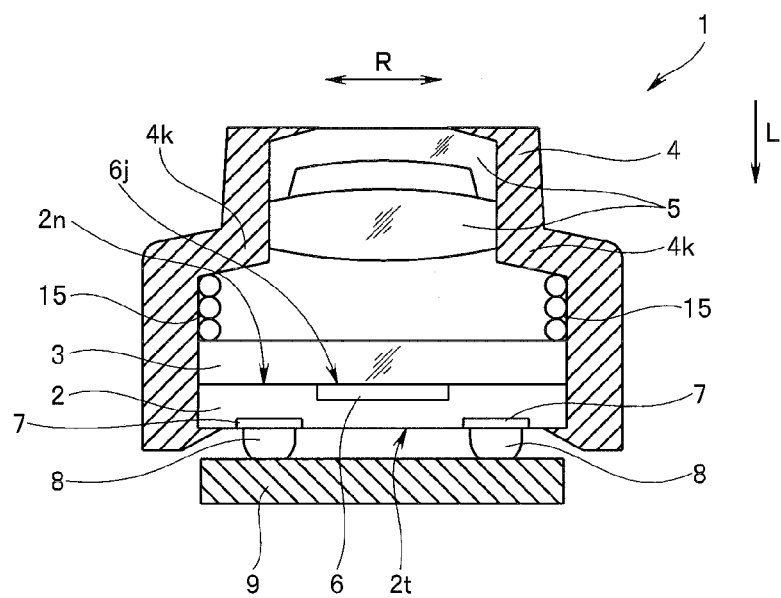
FIG. 2 is a partial cross-sectional view illustrating a modification of the image pickup unit illustrated in FIG. 1 in which a claw portion of a lens frame is pressed against an opposing surface of an image pickup device using an elastic member.

A modification will now be described with reference to FIG. 2. FIG. 2 is a partial cross-sectional view illustrating a modification of the image pickup unit illustrated in FIG. 1 in which a claw portion of a lens frame is pressed against an opposing surface of an image pickup device using an elastic member.

In the present embodiment described above, it has been shown that the abutting of the claw portion 4t to the opposing surface 2t is performed after the cover glass 3 covers an outer circumference of the image pickup device 2 adhered to the light-entering surface 2n by having the lens frame 4 that holds the image pickup optical system 5 pulled frontward in the optical axis direction L in a state where the claw portion 4t is tentatively abutted to the opposing surface 2t via an adhesive.

In addition to the above, as illustrated in FIG. 2, the abutting of the claw portion 4t to the opposing surface 2t may be performed by a coil spring 15 that is an elastic member provided inside the lens frame 4.

Specifically, in the lens frame 4, one end of the coil spring 15 is fixed to a crank portion 4k of the lens frame 4 and the other end thereof is abutted to the cover glass 3.

Accordingly, the coil spring 15 presses the light-entering surface 2n of the image pickup device 2 rearward and the opposing surface 2t is pressed against the claw portion 4t. As a result, the opposing surface 2t abuts the claw portion 4t via an adhesive.

Moreover, in the present embodiment, while one end of the coil spring 15 is fixed to the crank portion 4k of the frame body for the sake of illustration, the configuration is not restrictive and the coil spring 15 need only be fixed to a portion of the lens frame 4 between the image pickup device 2 and the image pickup optical system 5. In this case, the lens frame 4 need not include the crank portion 4k.

In addition, while a configuration is adopted in which the opposing surface 2t is abutted to the claw portion 4t via an adhesive, the configuration is not restrictive. Alternatively, a configuration may be adopted in which a state where the opposing surface 2t is pressed against the claw portion 4t is maintained solely by having the coil spring 15 press the light-entering surface 2n rearward without using an adhesive.

Second Embodiment

Figure 3:
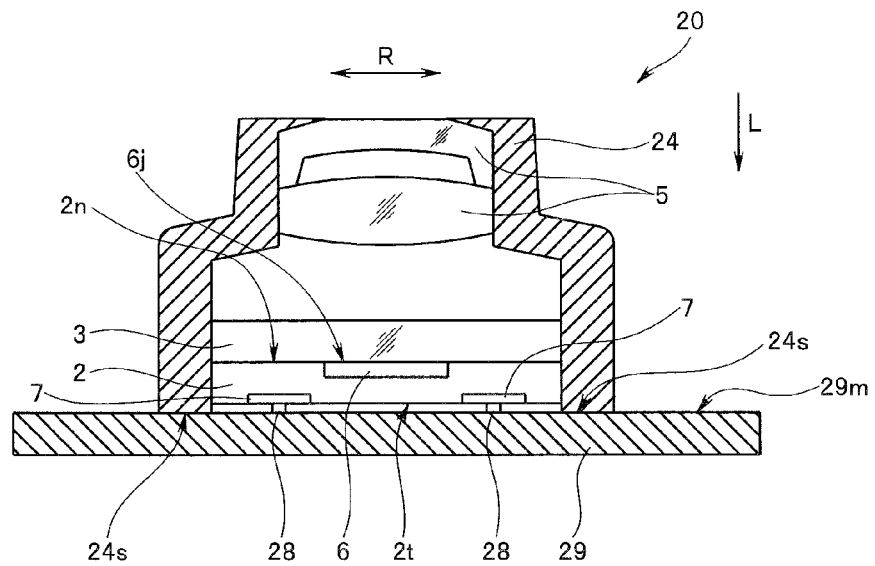
FIG. 3 is a partial cross-sectional view schematically illustrating a configuration of an image pickup unit according to a second embodiment.

FIG. 3 is a partial cross-sectional view schematically illustrating a configuration of an image pickup unit according to the present embodiment.

The configuration of the image pickup unit according to the present second embodiment differs from the aforementioned image pickup unit 1 according to the first embodiment and illustrated in FIG. 1 in that a position of an image pickup optical system with respect to a light-receiving section is defined by having a lens frame indirectly abut an opposing surface of the image pickup device. Therefore, only this difference will be described. Components similar to those of the first embodiment are to be denoted by the same reference numerals and a description thereof will be omitted.

As illustrated in FIG. 3, in the present embodiment, an electrode pad 7 of an image pickup device 2 of an image pickup unit 20 is electrically connected to one surface 29m of a printed circuit board 29 by, for example, flip-chip mounting via an electrode 28 such as an Au bump whose height can be managed with high positional accuracy in an optical axis direction L or, more specifically, via an electrode 28 whose height can be managed to around ± several μm.

In addition, in the present embodiment, an end portion 24s on the side of the lens frame 24 that is a frame body which holds the image pickup device 2 is adhered to the one surface 29m of the printed circuit board 29 with an accuracy of around ±5 μm.

As a result, the position of the image pickup optical system 5 in the optical axis direction L with respect to the light-receiving section 6 is indirectly defined via the electrode 28 and the printed circuit board 29 with the opposing surface 2t as a reference. Since the height of the electrode 28 in the optical axis direction can be managed down to around ± several μm, the position of the image pickup optical system 5 in the optical axis direction L with respect to the light-receiving section 6 can be accurately defined.

According to such a configuration, since the position of the image pickup optical system 5 in the optical axis direction L with respect to the light-receiving section 6 can be defined at a tolerance of a thickness tolerance of the image pickup device 2 (around ± several ten nm to around ±1 μm)+a dimensional tolerance of the electrode 28 (around ± several μm)+a tolerance of the end portion 24s with respect to the one surface 29m (around ±5 μm), similar advantageous effects as those of the first embodiment described above can be obtained.

Furthermore, since the image pickup unit 1 can be assembled by merely covering the lens frame 24 so that the end portion 24s abuts the one surface 29m of the printed circuit board 29 in a state where the image pickup device 2 is electrically connected to the printed circuit board 29 via the electrode 28 by flip-chip mounting, assembly can be performed with greater ease than in the first embodiment described above.

Moreover, inventions of various stages are included in the embodiments described above, and various inventions can be extracted by appropriately combining the plurality of essential components disclosed therein. For example, even when some essential components are deleted from all essential components shown in one of the aforementioned embodiments, if the problem to be solved in the present invention is solvable and the advantageous effect of the present invention is attainable, then a configuration from which these essential components have been deleted can be extracted as an invention.

[Appendix]

As described in detail above, according to embodiments of the present invention, the following configurations can be obtained. That is, (1) An image pickup unit including:

a frame body that internally holds an image pickup optical system;

a backside illuminated image pickup device which has a light-receiving section that receives light entering the frame body via the image pickup optical system and which is held inside the frame body;

a substrate which is made of a material capable of performing a light-emitting function, which is electrically connected via an electrode to an opposing surface that opposes a light-entering surface of the image pickup device on which the light-receiving section is arranged, and to which abuts an end portion of the frame body in the optical axis direction on the side that holds the image pickup device; and a light-emitting section formed outward in a radial direction of the frame body than the frame body on the substrate.

(2) The image pickup unit described in Appendix 1, wherein the substrate has a function of supporting the image pickup device.

(3) The image pickup unit described in Appendix 1 or 2, wherein the light-emitting section is formed on the substrate so as to enclose the frame body in a plan-viewed state from the direction of the image pickup optical system.

(4) The image pickup unit described in any one of Appendices 1 to 3, wherein the frame body is made of a light-shielding material that shields light emitted from the light-emitting section.

Conventionally, when grinding is performed on a rear surface-side of a backside illuminated image pickup device that becomes a light-receiving surface or, in other words, when grinding is performed on a substrate during processing/mounting of the image pickup device, a substrate thickness equal to or less than 5 to 10 μm makes handling of the image pickup device itself difficult and a need for a supporting member for supporting the image pickup device arises.

In addition, Japanese Patent Application Laid-Open Publication No. 2007-13089 proposes the use of a semiconductor on which is formed a circuit having a driving/signal processing function of an image pickup device as a supporting member for supporting the image pickup device.

However, in the case of a CMOS type image pickup device that is increasingly coming into practical use in recent years, since a driving/signal processing function of the image pickup device is integrally formed with the image pickup device, the driving/signal processing function need not be formed on a supporting member.

Furthermore, when picking up an image of a subject with an image pickup device, a configuration in which a light-emitting member such as an LED is mounted on an image pickup unit has been desired in order to perform photography with higher brightness and image quality.

Figure 4:
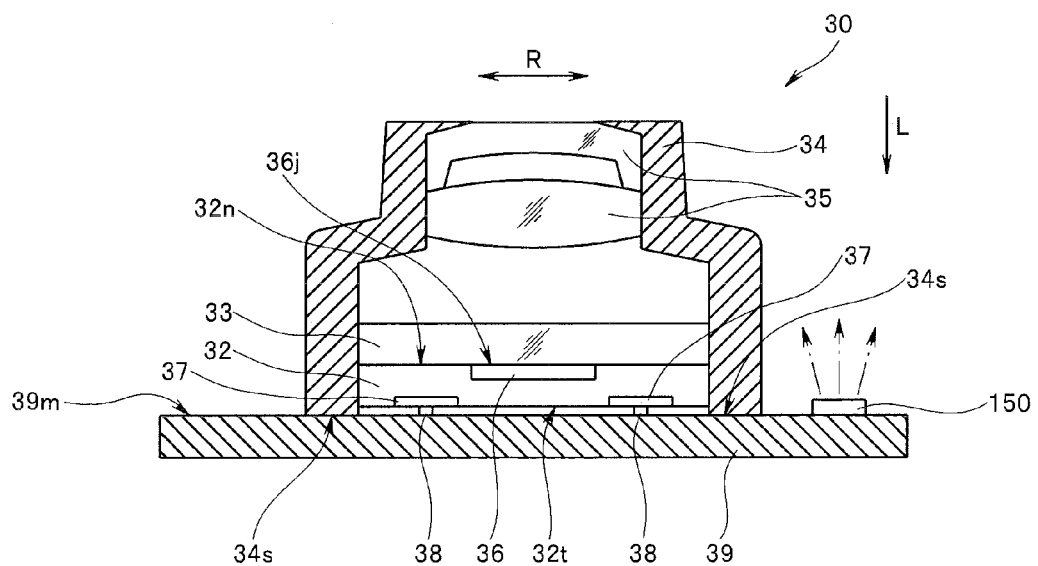
FIG. 4 is a partial cross-sectional view schematically illustrating a configuration of an image pickup unit according to an Appendix.

The present Appendix has been conceived in consideration of the circumstances described above and an object thereof is to provide an image pickup unit which includes a light-emitting member and which is configured such that a driving/signal processing function is integrally formed with a backside illuminated image pickup device. Hereinafter, a configuration of the image pickup unit will be shown with reference to FIG. 4. FIG. 4 is a partial cross-sectional view schematically illustrating a configuration of an image pickup unit according to the present Appendix.

As illustrated in FIG. 4, an image pickup unit 30 includes a lens frame 34 that is a frame body which internally holds an image pickup optical system 35. While the image pickup optical system 35 is made up of a plurality of lenses in FIG. 4, the image pickup optical system 35 may alternatively be made of a single lens. In addition, the lens frame 34 is shaped such that a midway position in an optical axis direction L is bent in, for example, a crank shape.

The lens frame 34 internally holds a known backside illuminated image pickup device 32 including a light-receiving section 36 more backward in an optical axis direction L than the image pickup optical system 35. Moreover, an outer circumferential surface of the image pickup device 32 need not necessarily be adhered to an inner circumferential surface of the lens frame 34. In addition, a circuit having a driving/signal processing function is formed on the image pickup device 32.

A known cover glass 33 for protecting a light-receiving surface 36j of the light-receiving section 36 is adhered onto a surface of the image pickup device 32 on the side of the image pickup optical system 35 (hereinafter referred to as a light-entering surface 32n). Besides protecting the light-receiving surface 36j, the cover glass 33 functions to support the image pickup device 32 thinly formed to a thickness of, for example, 5 to 10 μm.

An electrode pad 37 is formed on an opposing surface 32t opposing the light-entering surface 32n of the image pickup device 32. A substrate 39 is electrically connected to the electrode pad 37 via an electrode 38. The substrate 39 is made of a material capable of performing a light-emitting function such as GaN (gallium nitride) material. The substrate 39 also functions to support the image pickup device 32. Therefore, the cover glass 33 need not necessarily be adhered.

An end portion 34s of the lens frame 34 on the side of the image pickup device 32 is abutted and adhered to one surface 39m of the substrate 39 to which the electrode 38 is connected.

In addition, a light-emitting section 150 is integrally formed with the substrate 39 made of a material capable of performing a light-emitting function on the one surface 39m of the substrate 39 more outward in a radial direction R of the lens frame 34 than the abutting position of the end portion 34s of the lens frame 34. Moreover, a configuration may also be adopted in which the light-emitting section 150 is mounted on the substrate 39. In this case, the substrate 39 no longer need be made of a material capable of performing a light-emitting function.

Furthermore, a plurality of light-emitting sections 150 may be formed on the substrate 39 so as to enclose the lens frame 34 in a plan-viewed state from the direction of the image pickup optical system 5.

In addition, in the present configuration, the lens frame 34 is made of a light-shielding member that prevents light emitted from the light-emitting section 150 from entering the image pickup optical system 35.

As shown, in the present configuration, the light-emitting section 150 is provided on the substrate 39. Accordingly, in the image pickup unit 30 using the backside illuminated image pickup device 32, an image of a subject can be picked up with higher brightness and image quality, and furthermore, downsizing of the image pickup unit 30 including the light-emitting section 150 can be realized.

Consequently, an image pickup unit including a light-emitting member can be provided with a configuration in which a driving/signal processing function is integrally formed with a backside illuminated image pickup device.

In addition, as described in detail above, according to embodiments of the present invention, the following configurations can be obtained. That is, (5) An image pickup unit including:

a frame body that internally holds an image pickup optical system;

a backside illuminated image pickup device which has a light-receiving section that receives light entering the frame body via the image pickup optical system and which is held inside the frame body;

a cover glass adhered via an air gap to a light-entering surface of the image pickup device on which the light-receiving section is arranged;

a first substrate which supports the image pickup device and which is fixed to a position that at least overlaps the air gap in a plan-viewed state on an opposing surface that opposes the light-entering surface of the image pickup device; and a second substrate which is electrically connected via an electrode to the opposing surface of the image pickup device and to which abuts an end portion of the frame body in an optical axis direction on the side that holds the image pickup device, wherein a depressed portion into which the first substrate is fitted is formed on the second substrate.

(6) The image pickup unit according to Appendix 5, wherein the first substrate is fixed to the opposing surface of the image pickup device more inward in a radial direction of the frame body than the electrode.

(7) An image pickup unit including:

a frame body that internally holds an image pickup optical system;

a backside illuminated image pickup device which has a light-receiving section that receives light entering the frame body via the image pickup optical system and which is held inside the frame body;

a cover glass adhered via an air gap to a light-entering surface of the image pickup device on which the light-receiving section is arranged;

a first substrate which supports the image pickup device and which is fixed to a position that at least overlaps the air gap in a plan-viewed state on an opposing surface that opposes the light-entering surface of the image pickup device; and a second substrate which is electrically connected via an electrode to the opposing surface of the image pickup device and to which abuts an end portion of the frame body in an optical axis direction on the side that holds the image pickup device, wherein the electrode is formed higher in the optical axis direction than the first substrate.

When grinding is performed on a rear surface of a backside illuminated image pickup device that becomes a light-receiving surface or, in other words, when grinding is performed on a substrate during processing/mounting of the image pickup device, a substrate thickness equal to or less than 5 to 10 μm makes handling of the image pickup device itself difficult and a need for a supporting member for supporting the image pickup device arises. In particular, when forming a known air gap on a pixel, a problem occurs in that the ground substrate is susceptible to deformation.

In addition, Japanese Patent Application Laid-Open Publication No. 2008-210846 proposes the use of a semiconductor on which is formed a circuit having a driving/signal processing function of an image pickup device as a supporting member for supporting the image pickup device.

However, with this configuration, since an electrode pad formed on a front surface-side of the image pickup device or, in other words, a wiring-side surface becomes hidden by a supporting substrate, the electrode pad must be connected to the supporting substrate and wiring must reach a rear surface-side of the supporting substrate via a through hole or the like, resulting in a problem in that, in addition to processes becoming more complex, the size of the image pickup unit is increased.

Figure 5:
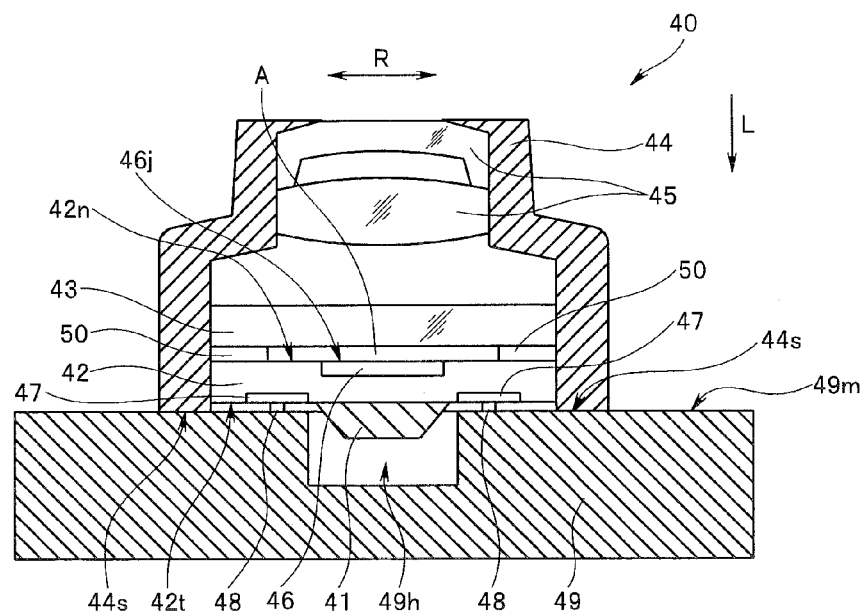
FIG. 5 is a partial cross-sectional view schematically illustrating a configuration of an image pickup unit according to the Appendix which differs from FIG. 4.

The present Appendix has been made in consideration of the above problems and an object thereof is to provide an image pickup unit having a configuration capable of preventing an increase in size even if a supporting substrate is fixed to a wiring-side of a backside illuminated image pickup device. Hereinafter, a configuration of the image pickup unit will be shown with reference to FIG. 5. FIG. 5 is a partial cross-sectional view schematically illustrating a configuration of an image pickup unit according to the present Appendix.

As illustrated in FIG. 5, an image pickup unit 40 includes a lens frame 44 that is a frame body which internally holds an image pickup optical system 45. While the image pickup optical system 45 is made up of a plurality of lenses in FIG. 5, the image pickup optical system 45 may alternatively be made of a single lens. In addition, the lens frame 44 is shaped such that a midway position in an optical axis direction L is bent in, for example, a crank shape.

The lens frame 44 internally holds a known backside illuminated image pickup device 42 including a light-receiving section 46 more backward in an optical axis direction L than the image pickup optical system 45. Moreover, an outer circumferential surface of the image pickup device 42 need not necessarily be adhered to an inner circumferential surface of the lens frame 44. In addition, a circuit having a driving/signal processing function is formed on the image pickup device 42.

A known cover glass 43 for protecting a light-receiving surface 46j of the light-receiving section 46 is adhered onto a surface of the image pickup device 42 on the side of the image pickup optical system 45 (hereinafter referred to as a light-entering surface 42n) via an air gap A by a spacer 50. Besides protecting the light-receiving surface 46j, the cover glass 43 functions to support the image pickup device 42 thinly formed to a thickness of, for example, 5 to 10 μm.

In addition, the air gap A is formed such that an outline thereof is approximately the same or greater than the light-receiving section 46 in a plan-viewed state from the side of the image pickup optical system 45.

An electrode pad 47 is formed on an opposing surface 42t opposing the light-entering surface 42n of the image pickup device 42. A second substrate 49 is electrically connected to the electrode pad 47 via an electrode 48. An end portion 44s of the lens frame 44 on the side of the image pickup device 42 is abutted and adhered to one surface 49m of the second substrate 49 to which the electrode 48 is connected.

In addition, a first substrate 41 that supports the image pickup device 42 is fixed to the opposing surface 42t at a position that overlaps the air gap A in a plan-viewed state or, specifically, more inward in a radial direction R than the electrode 48.

The first substrate 41 is formed such that an outline thereof is approximately the same or greater than the air gap A in a plan-viewed state from the side of the image pickup optical system 45. Furthermore, the first substrate 41 is simply a supporting member and wiring, through holes, and the like are not to be formed thereon.

Moreover, a depressed portion 49h into which the first substrate 41 is to be fitted is formed on the second substrate 49 at a position that overlaps the first substrate 41 in a plan-viewed state from the side of the image pickup optical system 45.

According to the present configuration, since the first substrate 41 that supports the image pickup device 42 is fixed to a portion other than a connection between the image pickup device 42 and the substrate 49, downsizing of the image pickup unit 40 can be realized.

In addition, the presence of the air gap A enables an image of a subject to be picked up with higher sensitivity, and since deformation and breakage of the image pickup device 42 due to the formation of the air gap A can be prevented by the first substrate 41, assembly can be performed with greater ease.

Accordingly, the image pickup unit 40 having a configuration capable of preventing an increase in size even if the supporting substrate 41 is fixed to a wiring-side of the backside illuminated image pickup device 42 can be provided.

Figure 6:
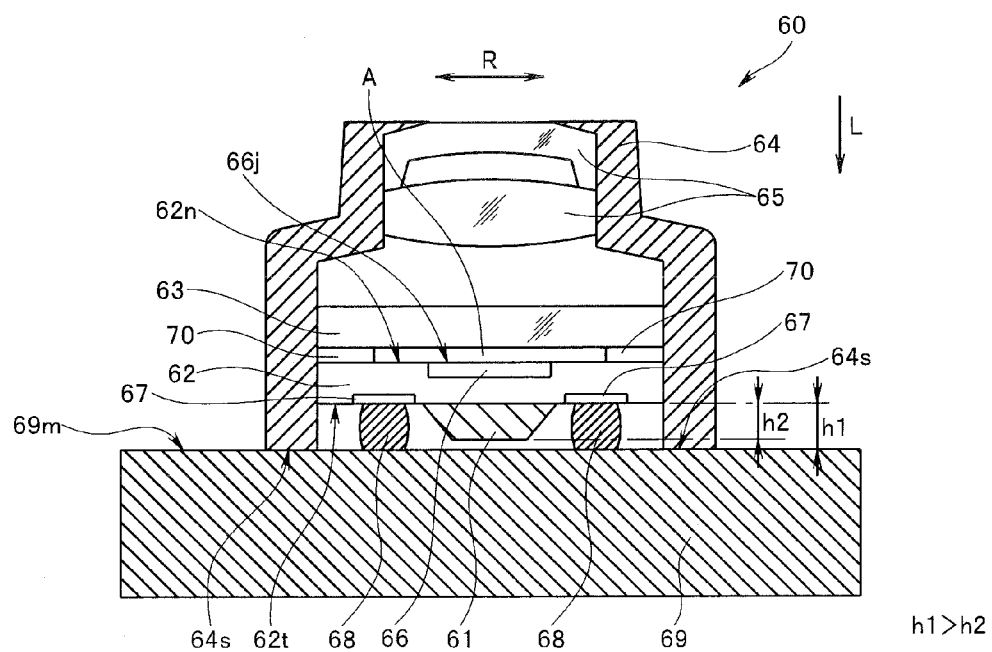
FIG. 6 is a partial cross-sectional view schematically illustrating a configuration of an image pickup unit that differs from FIG. 5.

A different configuration from that illustrated in FIG. 5 will now be shown with reference to FIG. 6. FIG. 6 is a partial cross-sectional view schematically illustrating a configuration of an image pickup unit that differs from FIG. 5.

As illustrated in FIG. 6, an image pickup unit 60 includes a lens frame 64 that is a frame body which internally holds an image pickup optical system 65. While the image pickup optical system 65 is made up of a plurality of lenses in FIG. 6, the image pickup optical system 65 may alternatively be made of a single lens. In addition, the lens frame 64 is shaped such that a midway position in an optical axis direction L is bent in, for example, a crank shape.

The lens frame 64 internally holds a known backside illuminated image pickup device 62 including a light-receiving section 66 more backward in an optical axis direction L than the image pickup optical system 65.

Moreover, an outer circumferential surface of the image pickup device 62 need not necessarily be adhered to an inner circumferential surface of the lens frame 64. In addition, a circuit having a driving/signal processing function is formed on the image pickup device 62.

A known cover glass 63 for protecting a light-receiving surface 66j of the light-receiving section 66 is adhered onto a surface of the image pickup device 62 on the side of the image pickup optical system 65 (hereinafter referred to as a light-entering surface 62n) via an air gap A by a spacer 70. Besides protecting the light-receiving surface 66j, the cover glass 63 functions to support the image pickup device 62 thinly formed to a thickness of, for example, 5 to 10 μm.

In addition, the air gap A is formed such that an outline thereof is approximately the same or greater than the light-receiving section 66 in a plan-viewed state from the side of the image pickup optical system 65.

An electrode pad 67 is formed on an opposing surface 62t opposing the light-entering surface 62n of the image pickup device 62. A second substrate 69 is electrically connected to the electrode pad 67 via an electrode 68 made of, for example, a solder ball.

An end portion 64s of the lens frame 64 on the side of the image pickup device 62 is abutted and adhered to one surface 69m of the second substrate 69 to which the electrode 68 is connected.

In addition, a first substrate 61 that supports the image pickup device 62 is fixed to the opposing surface 62t at a position that overlaps the air gap A in a plan-viewed state or, specifically, more inward in a radial direction R than the electrode 68.

The first substrate 61 is formed such that an outline thereof is approximately the same or greater than the air gap A in a plan-viewed state from the side of the image pickup optical system 65. Furthermore, the first substrate 61 is simply a supporting member and wiring, through holes, and the like are not to be formed thereon.

Moreover, a height h2 of the first substrate 61 in an optical axis direction L is formed lower than a height h1 of the electrode 68 in the optical axis direction L (h2<h1).

According to such a configuration, in addition to the effect of the aforementioned configuration illustrated in FIG. 5, since a depressed portion is not formed on the second substrate 69, a flat-plate printed circuit board can be used as the second substrate 69.

Furthermore, inventions of various stages are included in the embodiments described above, and various inventions can be extracted by appropriately combining the plurality of essential components disclosed therein. For example, even when some essential components are deleted from all essential components shown in one of the aforementioned embodiments, if the problem to be solved in the present invention is solvable and the advantageous effect of the present invention is attainable, then a configuration from which these essential components have been deleted can be extracted as an invention.

For example, even when some essential components are deleted from all essential components shown in the examples, if the problem to be solved in the present invention is solvable and the advantageous effect of the present invention is attainable, then a configuration from which these essential components have been deleted can be extracted as an invention.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pickup unit, comprising:
   a frame body that internally holds at least one image pickup optical element;
   a backside illuminated image pickup device which has a light-receiving section that receives light entering the frame body via the at least one image pickup optical element, the image pickup device being directly held by the frame body;
   a substrate electrically connected via an electrode to an opposing surface that opposes a light-entering surface on which the light-receiving section of the image pickup device is arranged;
   a cover glass arranged to cover the light-receiving section, and
   a support substrate provided on the opposing surface of the image pickup device to support the image pickup device in an optical axis direction,
   wherein an end portion of the frame body, which directly holds the at least one image pickup optical element on the side holding the image pickup device, abuts and is directly adhered to the substrate, and thereby a position of the at least one image pickup optical element with respect to the light-receiving section is defined, and
   wherein the substrate includes a depression to accommodate the support substrate.

2. The image pickup unit of claim 1, wherein the support substrate is provided at a position in a radial direction corresponding to a position of the light receiving section of the image pickup device in the radial direction.

3. The image pickup unit of claim 1, wherein the support substrate includes no wiring or through holes.

4. The image pickup unit of claim 1, wherein all electrical connections between the substrate and the image pickup device are disposed between the frame and a wall defining an outer periphery of the depression in a radial direction.

5. An image pickup unit, comprising:
   a frame body that internally holds at least one image pickup optical element;
   a backside illuminated image pickup device which has a light-receiving section that receives light entering the frame body via the at least one image pickup optical element, the image pickup device being directly held by the frame body;
   a substrate electrically connected via an electrode to an opposing surface that opposes a light-entering surface on which the light-receiving section of the image pickup device is arranged;
   a cover glass arranged to cover the light-receiving section, and
   a support substrate provided on the opposing surface of the image pickup device to support the image pickup device in an optical axis direction,
   wherein an end portion of the frame body, which directly holds the at least one image pickup optical element on the side holding the image pickup device, abuts and is directly adhered to the substrate, and thereby a position of the at least one image pickup optical element with respect to the light-receiving section is defined, and
   wherein the electrode is sized in the optical axis direction so as to accommodate the support substrate between the substrate and the opposing surface of the image pickup device.

6. The image pickup unit of claim 5, wherein all electrical connections between the substrate and the image pickup device are disposed between the frame and an outer periphery of the support substrate in a radial direction.

* * * * *